Patented Feb. 12, 1946

2,394,641

UNITED STATES PATENT OFFICE 2,394,641

CATALYTIC POLYMERIZATION OF UNSATURATED HYDROCARBONS

Frank J. Soday, Swarthmore, Pa., assignor to The United Gas Improvement Company, a corporation of Pennsylvania No Drawing. Application October 9, 1941,
Serial No. 414,278

11 Claims. (Cl. 260—92.6)

This invention pertains generally to the catalytic polymerization of unsaturated hydrocarbons.

More particularly, this invention pertains to the polymerization of cyclopentadiene by means of surface active agents.

The invention will be described in connection with the production of a cyclopentadiene polymer of a specific type. However, it is to be understood that the process described herein may be employed in the production of cyclopentadiene polymers of other types.

Thus cyclopentadiene may be polymerized to form at least two broad types of polymers, one of which is characterized by being soluble in solvents such as benzene, toluene, chloroform, carbon tetrachloride, and high-flash naphtha, while the other is characterized by being insoluble in these solvents.

The polymerization usually is carried out while the cyclopentadiene is in solution in a suitable solvent.

While the invention is described more particularly in connection with the polymerization of cyclopentadiene, it is to be understood that the process is applicable to the polymerization of mixtures of cyclopentadiene with other like unsaturated materials. Thus, for example, light oil cyclopentadiene fractions containing lesser proportions of other like unsaturated hydrocarbons, such as, for example, methyl cyclopentadiene, may be polymerized by the method described herein with excellent results.

I have found that the soluble type of polymer may be produced by the use of surface active agents as catalysts under suitably controlled polymerizing conditions.

Examples of surface active agents are certain natural clays or earths, such as, for example, attapulgus clay, Tonsil, Halclay, Floridin, bleaching earths, kaolins, adsorbent earths, and the like; finely divided silica or hydrosilicates, such as, for example, silica gel; diatomaceous earths, such as, for example, fuller's earth, celite, and the like; finely divided carbon or charcoal; finely divided alumina; and finely divided metals, such as, for example, aluminum or zinc powder.

I prefer to use surface active earths, for example, surface active clays, diatomaceous earth, and the like.

In general, it may be said that these materials depend for their catalytic activity upon the extremely large surface area exposed per unit weight. Their activity, therefore, is directly proportional to their degree of fineness or dispersion.

In addition, these materials may be further activated, thus enhancing their polymerizing activity, if desired, by suitable treatment prior to their use as polymerizing agents. Thus, for example, the natural clays or earths may be treated with an acid or acidic substance, such as sulfuric acid, and/or the application of heat. After treatment with an acid or acidic substance, the treated material may, if desired, be washed to remove excess acid, and dried at elevated temperatures.

The activation of the surface active agents by the application of heat is a particularly desirable procedure, as this treatment removes absorbed gas and vapors, such as water, from the surface of the catalyst or catalysts, thus making a larger proportion of the surface available for catalytic activity of the type desired.

Due to their ready availability and low cost, the natural or activated clays or earths are preferred for the polymerization of cyclopentadiene.

There are at least four factors which influence the production of soluble polymer from cyclopentadiene. These four factors are (1) temperature, (2) concentration of cyclopentadiene, (3) proportion of catalyst, and (4) time.

Generally speaking, and with all other conditions remaining the same, it appears that there is a threshold temperature for the formation of insoluble polymer, and that at all temperatures below this threshold temperature, soluble polymer is obtained. It is recognized that high concentrations of cyclopentadiene and/or high proportions of catalyst might place this theoretical threshold temperature below commercially obtainable temperature levels. However, for reasonable concentrations of cyclopentadiene and reasonable proportions of catalyst a threshold temperature can be shown to exist for any given concentration of cyclopentadiene with any given proportion of catalyst.

Also generally speaking, and with all other conditions remaining the same, it appears that there is a threshold concentration of cyclopentadiene for the formation of insoluble polymer, and that at all concentrations below this threshold concentration the soluble form of polymer is obtained. The term "concentration of cyclopentadiene" as used herein and in the claims specifies the percentage by weight of cyclopentadiene, whether reacted or not, in solution in the polymerizing vessel after all of the materials have been combined. It is recognized that inordinately high temperatures and/or inordinately high proportions of catalyst may make the theoretical threshold concentration difficult of determination. However, for reasonable temperatures and reasonable proportions of catalyst, a threshold concentration of cyclopentadiene can be shown to exist at any given temperature with any given proportion of catalyst.

Also generally speaking, and with all other conditions remaining the same, and assuming that all of the materials have been combined, it appears that there is a threshold proportion of catalyst for the formation of insoluble polymer, and that with all proportions below this threshold the soluble polymer results.

On the other hand, threshold proportions of catalyst are not required to polymerize all of the cyclopentadiene into the soluble polymer, although it will be recognized that a minimum proportion will be required for maximum yields.

It is recognized that inordinately high temperatures and/or inordinately high concentrations of cyclopentadiene may make the theoretical threshold proportion of catalyst difficult of determination. However, for reasonable temperatures and reasonable concentrations of cyclopentadiene a threshold proportion of catalyst can be shown to exist at any given temperature with any given concentration of cyclopentadiene.

Also generally speaking, and all other conditions remaining the same, it appears that there is a threshold reaction time for the formation of insoluble polymer, and that for all reaction times below this threshold reaction time the soluble polymer results. It is recognized that low temperatures, low concentrations of cyclopentadiene, and/or low proportions of catalyst may cause this theoretical threshold reaction time to approach infinity. On the other hand, high temperatures, high concentrations of cyclopentadiene, and/or high proportions of catalyst may cause this theoretical threshold reaction time to approach zero. However, for reasonable temperatures, for reasonable concentrations of cyclopentadiene, and/or for reasonable proportions of catalyst, a threshold reaction time can be shown to exist.

When threshold conditions are just exceeded, insoluble polymer is formed, resulting in a mixture of soluble and insoluble polymers. When exceeding threshold conditions to a greater extent, however, insoluble polymer may be formed exclusively. The band over which both soluble and insoluble polymers are formed varies in width with change in conditions. For instance, this band decreases in width with increase in temperature.

Furthermore, the exact values of (1) temperature, (2) concentration of cyclopentadiene, (3) proportion of catalyst and (4) time at which insoluble polymer begins to appear may vary somewhat with a change in the composition or the purity of the cyclopentadiene, or of the catalyst, or a change in the catalyst or solvent. However, the exact values may be readily determined by test.

The type of soluble polymer obtained varies somewhat in physical characteristics with the solvent used during the polymerization. For instance, soluble polycyclopentadienes obtained by polymerizing cyclopentadiene by my new process in solvent naphtha, toluene, or benzene differ somewhat from each other as shown, for example, in the suitability of these polycyclopentadienes for coating metals, for which they are unusually well suited. As an illustration, for certain purposes the benzene polymer is superior, the toluene polymer coming next but being, nevertheless, particularly well suited.

Accordingly, in the preparation of my polymerized cyclopentadiene a solution of cyclopentadiene in a chosen solvent such as toluene is employed.

I use as catalyst one or more finely divided surface active agents, which have been more particularly described previously. Excellent results are obtained when certain types of naturally active clays are employed. The clays may be activated prior to use, if desired, such as by treatment with acids, particularly sulfuric acid, and/or heat, or otherwise.

The reactants preferably should not be combined too rapidly, since under such circumstances the reaction may proceed too violently and cause local overheating with the production of insoluble polymer, or undesirable color bodies, or both.

While the catalyst may be added to the solution of cyclopentadiene particularly when the catalyst itself is in suspension in a solvent, I prefer to add the solution of cyclopentadiene to a suspension of the catalyst, particularly when large quantities of cyclopentadiene are to be polymerized. This affords a more exact control of the amount and distribution of cyclopentadiene undergoing reaction at any one time, and the reaction has a tendency to proceed much more smoothly than when the catalyst is added to the cyclopentadiene. In the latter case, the reaction may not take place until a certain catalyst concentration is reached, whereupon the reaction proceeds at a very high rate, and may get out of control.

In either event, however, the addition of one material to the other is preferably accompanied by thorough stirring, which is preferably of such nature as to insure a uniform distribution of the materials, as well as an even distribution of temperature throughout the reaction mass.

In addition, the reaction is preferably carried out in apparatus capable of temperature control, such as a jacketed vessel provided with an agitator.

A very effective control of the temperature of the reaction and of local superheating is afforded when the preferred procedure is followed.

As an example, the proportion of catalyst may conveniently be between 5% to 100% by weight of cyclopentadiene, provided the temperature of the reaction is controlled and/or the concentration of cyclopentadiene is sufficiently low, thus avoiding the formation of insoluble polymer.

A proportion of catalyst between 10% to 50% by weight of the total cyclopentadiene present is found to be very convenient. It permits wide variation in temperatures and in concentrations of cyclopentadiene without undue danger of the formation of insoluble polymer.

Incidentally, it appears that the molecular weight of the resulting soluble polycyclopentadiene may be varied somewhat by varying the proportion of catalyst.

For instance, at all temperatures below 50° C gel-like polymers may be obtained when high proportions of catalyst are employed, such as a quantity just below the threshold amount. The ease with which gel-like polymers are obtained usually increases with decrease in temperature. These polymers are completely soluble in the usual solvents.

Incidentally, the formation of gel-like polymers does not indicate definitely the presence of insoluble polymer.

Temperatures above 150° C. are preferably avoided and it is recommended that great care be taken to keep the temperature throughout the reaction below this point.

It is found that temperatures between 10° C. to 120° C. are suitable, provided the reactants are sufficiently agitated, or other steps are taken to avoid local overheating. The preferred temperature range is between 20° C. and 100° C.

Incidentally, the molecular weight of the resulting soluble polycyclopentadiene may be varied somewhat by varying the temperature.

With all other conditions equal, an increase in the reaction temperature usually results in a decrease in the molecular weight of the resulting polymer.

Cyclopentadiene solutions of any suitable concentration can be used, keeping in mind what has been said with respect to threshold conditions, although I more often employ concentrations of cyclopentadiene of from 15% to 60% by weight of total solution.

Incidentally, it appears that the molecular weight of the resulting soluble polycyclopentadiene may be varied somewhat by varying the concentration of cyclopentadiene in the starting material.

Under the recommended conditions, the polymer is formed in good yield and with a satisfactory color.

The chosen time for the reaction may vary considerably, keeping in mind what has been said with respect to threshold conditions. I find that for practicable purposes and good yields, other conditions should be chosen such that the reaction time is somewhere in the neighborhood of 2 hours, or more. This is borne out by the fact that the yield increases with reaction time up to a certain point. The time is, of course, preferably chosen to obtain good yields.

The following specific examples will serve to further illustrate the invention.

Example 1

A mixture of 50 parts of cyclopentadiene and 50 parts of toluene was polymerized with 15 parts of a naturally occurring active clay (known commercially as Halclay) at a temperature of 30–35° C. A quantity of cyclohexane was then added to the mixture, the solution filtered, and the toluene removed by distillation under reduced pressure. A solution of polycyclopentadiene in cyclohexane thus was secured.

Example 2

A 50 gram portion of cyclopentadiene obtained from light oil, and containing small quantities of methyl cyclopentadiene, was added slowly to a suspension of 5 grams of Tonsil in 50 grams of toluene with good agitation at a temperature of 20–40° C. The reaction was permitted to proceed for a period of ½ hour after the addition of the cyclopentadiene had been completed. After filtering to remove the catalyst, a solution of polycyclopentadiene in toluene was obtained.

Example 3

A 50 gram portion of cyclopentadiene obtained from light oil resulting from the manufacture of oil gas and containing minor proportions of other diolefines boiling in the same general range of temperature as cyclopentadiene, was polymerized with 5 grams of Halclay in the presence of 50 grams of toluene at a temperature of 23° C. with good agitation. After the addition of the cyclopentadiene had been completed, the temperature slowly was increased to 90° C. by the external application of heat during a period of one hour. Upon cooling to room temperature and filtering a solution of polycyclopentadiene in toluene was obtained.

Example 4

A 50 gram portion of cyclopentadiene was added to a suspension of 15 grams of Halclay, which had been heated to 150° C. previously in order to expel any water present and to activate the material, in 50 grams of toluene at a temperature of 30–35° C. with good agitation. After the reaction had been completed, the catalyst was removed by filtration, resulting in a solution of polycyclopentadiene in toluene.

Example 5

A 50 gram portion of a light oil cyclopentadiene fraction was polymerized by the use of 15 grams of diatomaceous earth as a catalyst in the presence of 50 grams of toluene at a temperature of 30° C. with good agitation. After the reaction had been completed, the diatomaceous earth was removed by filtration, resulting in the production of a toluene solution of polycyclopentadiene.

In the above specific examples, it will be noted that the cyclopentadiene is in diluted form during the polymerization. Furthermore, as pointed out previously, the cyclopentadiene may be added to the catalyst rather than vice versa in order to afford a better control of the speed and uniformity of the reaction, the amount of heat evolved, and the type of polymer produced. The reaction runs smoother and is much more easily controlled on a large scale.

Other polymerization procedures may, of course, be used if desired. Thus, for example, the catalyst may be added, preferably in small increments, to the cyclopentadiene fraction or solution, preferably in diluted form, with vigorous agitation. Another method comprises the addition of the total quantity of the catalyst to a minor proportion of the cyclopentadiene, or the cyclopentadiene fraction, initiating the reaction, and adding the remainder of the cyclopentadiene, or the cyclopentadiene fraction, at a rate sufficient to maintain the reaction temperature at the desired level. The cyclopentadiene or cyclopentadiene fraction may be diluted with any suitable solvent prior to polymerization by any of the methods listed, if desired.

The polycyclopentadiene prepared by the polymerization of cyclopentadiene according to the method described herein, may be used as such, or it may be concentrated in a vacuum still of suitable design to give a product containing any desired higher concentration of polycyclopentadiene. On the other hand, it may be diluted to give a solution containing any desired lower concentration of polycyclopentadiene, or a second solvent might be substituted, such as a higher boiling solvent. This may be done either before or after concentration by adding the second solvent and distilling.

In the above examples, the particular temperatures used were chosen to control the physical properties, such as the viscosity and color, of the product within the desired limits. It will be noted that at no time did the temperature exceed 150° C., or even 100° C. The manner of combining the reactants, constant agitation, and efficient cooling made it possible to prevent local overheating, and the formation of insoluble polymer.

In the above examples (1) temperature, (2) concentration of cyclopentadiene, (3) proportion of catalyst, and (4) reaction time may be varied considerably in the production of soluble polymer, having in mind what has been said with respect to threshold conditions. If it is found that insoluble polymer is obtained, one or more of the four conditions, namely (1) temperature, (2) concentration of cyclopentadiene, (3) proportion of catalyst, and (4) reaction time should be reduced until the soluble polymer is obtained.

Carrying out the polymerization in the presence of a solvent makes it possible to have any desired concentration of cyclopentadiene.

While in the above example no dilution of the product was required to facilitate filtering, it is to be understood that dilution with a solvent may be employed, if desired, particularly in the case of highly viscous products.

Generally speaking, for the formation of soluble polymer to the exclusion of insoluble polymer and/or extreme discoloration, temperatures should rarely exceed 150° C. and, preferably, should not exceed 120° C., concentrations of cyclopentadiene should rarely exceed 60% by weight of the total solution, except possibly at low temperatures, and concentrations of catalyst should rarely exceed 100% by weight of cyclopentadiene although these values are not to be considered as fixed limits. By having extremely low values for one or two of the items mentioned the third might possibly exceed the value given. Should a short reaction time be employed, that is, a reaction time substantially less than one hour, all three items might possibly be higher, but perhaps with a sacrifice in yield and color.

It should be kept in mind that there are for practical purposes minimum values for temperature, concentration of cyclopentadiene, proportion of catalyst, and time, which practice will show ought to be exceeded to obtain reasonable yields. For instance, I find that when using ordinary commercial toluene as the solvent, a certain quantity of catalyst is required before the reaction is initiated. On the other hand, if the maximum values given in the previous paragraph for temperature, catalyst and cyclopentadiene were used simultaneously, insoluble polymer might be formed, even though the reaction time chosen were as short as good practice would permit.

It is by the observance of the preferred principles set forth herein that a product having desired properties is produced in good yields.

The use of surface active agents of the type described herein as catalysts for the polymerization of cyclopentadiene is particularly desirable from the standpoint of simplifying the polymerizing process by the elimination of the usual hydrolysis step designed to neutralize and/or remove the catalyst from the reaction products, as well as from the standpoint of producing a polymer free from catalyst residues or hydrolysis products.

Thus, for example, cyclopentadiene may be polymerized by certain metallic halides and metallic halide-organic solvent complexes to give poly-cyclopentadiene possessing very desirable properties. However, the catalyst used must be very carefully removed by the use of certain methods which are somewhat costly and time-consuming. In the case of surface active agents of the type described herein, this step may be eliminated, and the catalyst removed by simple filtration.

Moreover, polycyclopentadiene obtained by the polymerization of cyclopentadiene by means of metallic halide and/or metallic halide-organic solvent complexes as catalysts frequently contains traces of halides. The halides presumably are firmly attached to the resin molecule and do not interfere with the use of the polymer as a coating agent in any way.

While in the foregoing specific examples, toluene was used as a polymerization medium, it is to be understood that other solvents may be substituted for toluene, of which benzene, xylene, ethyl benzene, solvent naphtha, petroleum naphtha, carbon tetrachloride, and ethylene dichloride are examples. The products obtained when benzene and toluene are employed as solvents during the polymerization are preferred for certain specific uses.

The product may be used for many purposes, such as, for example, for the preparation of lacquers generally, for the preparation of varnishes, either alone or in admixture with other resins, as an ingredient in enamels and paints, or, in fact, for the preparation of coating compositions generally. It is ideally suited to the coating of metals, such as, for example, for the coating of food containers as described and claimed in copending application, Serial Number 291,007, filed Aug. 19, 1939 by Newcomb K. Chaney, which has matured into Patent 2,345,583 granted April 4, 1944. This is especially true of the products polymerized in benzene and toluene solution.

As disclosed in my copending application, Serial Number 385,337, filed March 26, 1941 which has matured into Patent 2,384,141, granted Sept. 4, 1945, the addition of certain secondary aromatic amines to polycyclopentadiene improves the aging characteristics of the said polycyclopentadiene. The addition of secondary aromatic amines of the type described in the said copending application to soluble polycyclopentadiene of the type described herein has been found to give particularly desirable results.

In a similar manner, the addition of sulfur and/or sulfur-containing materials, as described in the copending application of Newcomb K. Chaney, Serial Number 370.138 filed Dec. 14, 1940, which has matured into Patent 2,380,149 granted July 10, 1945, and/or the addition of certain waxes, as described and claimed in the copending application of Alger L. Ward, Serial Number 371,988 filed Dec. 27, 1940, which has matured into Patent 2,387,626 granted Oct. 23, 1945 to soluble polycyclopentadiene of the type described herein gives unusually satisfactory results from the standpoint of certain specific applications, such as the coating of metallic sheets which are to be used subsequently for capstamping operations.

While I have spoken rather disparagingly of the insoluble type of polycyclopentadiene, this is because it has very few, if any, important uses at the present time, and its presence in soluble polycyclopentadiene solutions, such as liquid coating compositions, is not desired. Should an important use develop for the insoluble type of polycyclopentadiene, my process may likewise be used to obtain this material in good yield by exceeding threshold conditions, and particularly by exceeding threshold conditions sufficiently to cross the band within which both soluble and insoluble polycyclopentadienes are formed.

This may be accomplished by starting either with a solution of cyclopentadiene in a suitable solvent in the regular way, as outlined herein, and carrying the reaction beyond threshold conditions, or the starting material might be a solution of soluble polycyclopentadiene in a suitable solvent. The latter procedure has the advantage that the polycyclopentadiene may be purified prior to conversion to the insoluble form, if desired, so that fewer impurities will be present in the insoluble polycyclopentadiene subsequently obtained.

Likewise, it is possible to obtain soluble polycyclopentadiene of higher viscosity, or of otherwise changed characteristics, by starting with a solution of polycyclopentadiene and stopping the reaction before threshold conditions are exceeded.

While the invention has been particularly described in connection with the polymerization of cyclopentadiene, it is to be understood that it is applicable to the polymerization of substituted cyclopentadienes having the cyclopentadiene nucleus containing the characteristic conjugated double bonds of which methyl cyclopentadiene is an example, as well as to the polymerization of a mixture of unsaturated hydrocarbons in which cyclopentadiene is the preponderating unsaturated hydrocarbon present. However, it is to be understood that the polymer particularly described has certain unique characteristics which distinguishes it from polymers prepared from starting materials containing substantial quantities of unsaturated hydrocarbons other than cyclopentadiene. Examples of such other compounds are the alkyl, aryl, alkyl-aryl, and halogen substituted cyclopentadienes.

It is to be understood that the above specific examples are by way of illustration. Therefore changes, omissions, additions, substitutions, and/or modifications might be made within the scope of the claims without departing from the spirit of the invention which is intended to be limited only as required by the prior art.

I claim:

1. A process for the polymerization of cyclopentadiene, comprising mixing a large proportion of a hydrocarbon solvent and a small proportion of a surface active clay, slowly adding to said mixture with thorough agitation cyclopentadiene, maintaining the temperature throughout the resultant reaction not in excess of 120° C., the concentration of cyclopentadiene not in excess of 60% by weight, the proportion of catalyst to cyclopentadiene approximately between 10% and 50% by weight, and stopping said reaction while soluble polycyclopentadiene is present in the reaction mass.

2. A process for the polymerization of cyclopentadiene comprising contacting the cyclopentadiene with clay in the presence of an aromatic hydrocarbon solvent, maintaining the temperature throughout the resulting reaction not in excess of 100° C., the concentration of cyclopentadiene not in excess of 60% by weight, the proportion of catalyst to cyclopentadiene approximately between 10% and 50% by weight, and stopping the said reaction while soluble polycyclopentadiene is present in the reaction mass.

3. A process for the polymerization of cyclopentadiene comprising contacting cyclopentadiene with artificially activated clay in the presence of an aromatic solvent, maintaining the temperature throughout the resulting reaction not in excess of 100° C., the concentration of cyclopentadiene not in excess of 60% by weight, the proportion of catalyst to cyclopentadiene approximately between 10 and 50% by weight, stopping the said reaction while soluble polycyclopentadiene is present in the reaction mass, and filtering the resulting mass to obtain a clear solution of soluble polycyclopentadiene in said aromatic hydrocarbon solvent.

4. A process for catalytically polymerizing cyclopentadiene comprising contacting said cyclopentadiene with a surface active clay in the presence of a hydrocarbon solvent while maintaining the temperature throughout the resultant reaction not in excess of 150° C., the concentration of said cyclopentadiene not in excess of 60% by weight, and the proportion of catalyst to said cyclopentadiene approximately between 5% to 100% by weight, and stopping said reaction while soluble polymer is present in the reaction mass.

5. A process for catalytically polymerizing cyclopentadiene comprising mixing a large proportion of a hydrocarbon solvent with a small proportion of a surface active earth, slowly adding cyclopentadiene to said mixture with thorough agitation, maintaining temperature throughout the resultant reaction not in excess of 150° C., the concentration of cyclopentadiene not in excess of 60% by weight and the proportion of catalyst to cyclopentadiene approximately between 5% and 100% by weight, and stopping the reaction while soluble polymer is present in the reaction mass.

6. A process for polymerizing cyclopentadiene comprising mixing surface active clay and a hydrocarbon solvent, slowly adding cyclopentadiene to said diluted catalyst with thorough mixing while maintaining the temperature throughout the reaction mass not in excess of 100° C., the concentration of cyclopentadiene not in excess of 60% and the proportion of catalyst to cyclopentadiene not in excess of 100%, and stopping said reaction while soluble polycyclopentadiene is present in the reaction mass.

7. A process for the polymerization of cyclopentadiene comprising contacting said cyclopentadiene with diatomaceous earth in the presence of an aromatic hydrocarbon solvent, maintaining the temperature throughout the resulting reaction not in excess of 150° C., the concentration of cyclopentadiene not in excess of 60% by weight, the proportion of catalyst to cyclopentadiene approximately between 10% and 50% by weight, and stopping the reaction while soluble polycyclopentadiene is present in the reaction mass.

8. A process for polymerizing a compound selected from the group consisting of cyclopentadiene and methyl cyclopentadiene comprising contacting said compound with a surface active earth in the presence of a solvent, maintaining the temperature throughout the resulting reaction not in excess of 150° C., the concentration of said compound not in excess of 60% by weight, and the proportion of catalyst to said compound approximately between 5% and 100% by weight, and stopping said reaction while soluble polymer is present in the reaction mass.

9. A process for catalytically polymerizing methyl cyclopentadiene comprising contacting said methyl cyclopentadiene with a surface active clay in the presence of a hydrocarbon solvent while maintaining the temperature throughout the resultant reaction not in excess of 150° C., the concentration of said methyl cyclopentadiene not in excess of 60% by weight, and the proportion of catalyst to said methyl cyclopentadiene approximately between 5% and 100% by weight, and stopping said reaction while soluble polymer is present in the reaction mass.

10. A process for the polymerization of methyl cyclopentadiene comprising contacting the methyl cyclopentadiene with clay in the presence of an aromatic hydrocarbon solvent, maintaining the temperature throughout the resulting reaction not in excess of 100° C., the concentration of methyl cyclopentadiene not in excess of 60% by weight, the proportion of catalyst to methyl cyclopentadiene approximately between 10% and 50% by weight, and stopping the said reaction while soluble polymethylcyclopentadiene is present in the reaction mass.

11. A process for the polymerization of methyl cyclopentadiene comprising contacting said methyl cyclopentadiene with diatomaceous earth in the presence of an aromatic hydrocarbon solvent, maintaining the temperature throughout the resulting reaction not in excess of 150° C., the concentration of methyl cyclopentadiene not in excess of 60% by weight, the proportion of catalyst to methyl cyclopentadiene approximately between 10% and 50% by weight, and stopping the reaction while soluble polymethylcyclopentadiene is present in the reaction mass.

FRANK J. SODAY.